US006869063B2

(12) United States Patent
Gunnarsson et al.

(10) Patent No.: US 6,869,063 B2
(45) Date of Patent: Mar. 22, 2005

(54) SLEEVE VALVE AND METHOD FOR ITS ASSEMBLY

(75) Inventors: Bengt Gunnarsson, Hundvåg (NO); Per Olav Haughom, Tonstad (NO); Jan Spjuth, Nassjo (SE)

(73) Assignee: Triangle Equipment AS, Stavanger (NO)

( * ) Notice: Subject to any disclaimer, the term of this patent is extended or adjusted under 35 U.S.C. 154(b) by 195 days.

(21) Appl. No.: 10/258,072

(22) PCT Filed: Apr. 24, 2001

(86) PCT No.: PCT/NO01/00170

§ 371 (c)(1),
(2), (4) Date: Oct. 18, 2002

(87) PCT Pub. No.: WO01/86113

PCT Pub. Date: Nov. 15, 2001

(65) Prior Publication Data

US 2003/0047702 A1 Mar. 13, 2003

(30) Foreign Application Priority Data

Apr. 28, 2000 (NO) .......................................... 20002287

(51) Int. Cl.$^7$ .............................. E21B 34/12; F16K 3/24
(52) U.S. Cl. ......................... 251/297; 251/344; 251/345
(58) Field of Search ................................. 251/297, 309, 251/343–345

(56) References Cited

U.S. PATENT DOCUMENTS

| 3,567,176 A | * | 3/1971 | Johnson | 251/174 |
|---|---|---|---|---|
| 4,066,241 A | | 1/1978 | Read | 251/361 |
| 4,429,747 A | | 2/1984 | Williamson, Jr. | 166/321 |
| 4,846,442 A | | 7/1989 | Clarkson et al. | 251/328 |
| 4,856,756 A | | 8/1989 | Combs | 251/297 |
| 5,080,325 A | | 1/1992 | Dean, Jr. | 251/368 |
| 5,211,241 A | | 5/1993 | Mashaw, Jr. | 166/332 |
| 5,285,850 A | | 2/1994 | Bayh, III | 166/321 |
| 5,305,988 A | * | 4/1994 | Cox | 251/309 |
| 5,318,127 A | | 6/1994 | Hines et al. | 166/321 |
| 6,044,908 A | | 4/2000 | Wyatt | 166/332 |

FOREIGN PATENT DOCUMENTS

JP    6-241327    *  8/1994    ............ 251/309

* cited by examiner

Primary Examiner—J. Casimer Jacyna
(74) Attorney, Agent, or Firm—Jacobson Holman PLLC

(57) ABSTRACT

A sleeve valve device for fluid flow between a hydrocarbon reservoir and a well in the hydrocarbon reservoir comprises a fixed outer sleeve (1) and an inner sleeve (2) which is rotatable in order to bring apertures (3, 4) in the outer sleeve and the inner sleeve into and out of correspondence with each other, for adjustment of the fluid flow through the apertures. The inner sleeve comprises at least one external bulb (5) with a surface (6) which, in an unassembled, unloaded condition of the outer sleeve (1) and the inner sleeve (2), is at a distance (11) from the inner sleeve's centre line (9) which is greater than the outer sleeve's internal radius (r2). The bulb (5) has a surface (6) which is larger than a corresponding aperture (3) in the outer sleeve, and by means of a rotation of the inner sleeve (2) to a closed position of the sleeve valve, the bulb (5) can be caused to cover the outer sleeve's aperture (3), whereby the bulb (5) in the closed position encompasses the outer sleeve's aperture (3) with a sealing contact pressure in an area (8) round the outer sleeve's aperture (3).

13 Claims, 7 Drawing Sheets

SLEEVE VALVE AND METHOD FOR ITS ASSEMBLY

This is a nationalization of PCT/N001/00170, filed Apr. 24, 2001 and published in English.

BACKGROUND OF THE INVENTION

1. Field of the Invention

The invention relates to a sleeve valve device for fluid flow between a hydrocarbon reservoir and a well in the hydrocarbon reservoir, wherein the well in the reservoir area comprises a casing, where the sleeve valve has an elongate, cylindrical shape and is mounted inside the casing or integrated in a portion of the casing and comprises a fixed outer sleeve and a rotatable inner sleeve which can be rotated by means of an actuator or a tool in order to bring apertures in the outer sleeve and the inner sleeve into and out of correspondence with each other, for adjustment of the fluid flow through the apertures.

The invention also relates to a method for assembly of the sleeve valve device, where the outer sleeve and the inner sleeve are produced separately.

2. Description of the Prior Art

For the recovery of hydrocarbons from-hydrocarbon reservoirs, wells are drilled from the seabed or the surface of the earth down to the reservoir which is under pressure. The wells are lined with casing to prevent them from collapsing. The casing is perforated in the reservoir area, thus enabling hydrocarbons to flow into the well. In order to lead the hydrocarbon flow out of the reservoir area, a production tubing is placed inside the casing. This production tubing extends from the seabed or the surface of the earth down to a production packer which is mounted between the tubing and the internal wall of the casing on the edge of or outside the reservoir area, and whose task is to prevent hydrocarbons from flowing up into the well on the outside of the tubing.

The well may extend for a great distance through the reservoir, for example 2000 metres. A hydrocarbon reservoir normally contains both oil, gas and water. The production conditions, i.e. primarily the amount of oil, gas and water and the pressure in the reservoir, usually vary along the well, and are altered in the course of the production period. The flow into the well at the various locations in the reservoir may be an almost pure flow of oil, gas or water, or a mixture of two or all three of these components.

In order to be able to maintain the pressure in the reservoir, and thereby maintain the flow into the well, it is always desirable to cut off the flow of water into the well. Whether it is desirable to cut off the influx of gas and flows containing a mixture of oil, gas and water depends on the capacity and type of processing equipment which process the well flow after it has emerged from the well. In some places it may be desirable to have a partial shut-off of the flow.

In order to maintain the pressure in the reservoir, in some places water or gas injection is employed, in which case it may be desirable to have the capability of controlling the influx into the reservoir along the well.

In order to regulate the flow to or from a well, sleeve valves may be employed, which can be mounted integrated in a portion of the casing, or which can be placed inside the casing. In order to be able to regulate the flow to or from the well at different places in the reservoir, sleeve valves are located at suitable intervals in the well. The sleeve valves comprise an external sleeve and an internal sleeve, both of which are equipped with apertures. The external sleeve is fixed, while the internal sleeve is movable in order to bring apertures in the two sleeves into and out of correspondence with each other for opening or closing the flow through the sleeve valve.

The sleeve valves have reciprocally movable surfaces facing each other, which surfaces in some of the positions of the sleeve valves are exposed to fluids in the well. Components found in these fluids have a tendency to be deposited on exposed surfaces, with the result that the sleeve valves may become jammed or cemented together by deposits.

A second problem associated with valves in hydrocarbon wells is sand, which becomes jammed in the valves and causes wear on movable surfaces.

A third problem is that the valves may be exposed to substantial pressure differences between the inside and the outside. These pressure differences may expand or compress the valves, thus influencing the valves' ability to block off the flow.

Problems of the above kind are known within other fields, and are often solved by flexible gaskets of a non-metallic material. In an oil well, however, the temperature may be 100° C., the pressure 200 bar or more, and there may be components which corrode the seal materials. Experience shows that no known seal materials can withstand such conditions over several years, and it is therefore desirable to find other constructive solutions to the above-mentioned problems.

U.S. Pat. No. 6,044,908 describes a sliding sleeve valve for controlling fluid flow between a well annulus and a string of well conduit, which valve comprises a slideable sleeve disposed coaxially within an outer housing, the valve being provided with a primary seal member carried by the housing for sealing engagement with the housing. The primary seal member in a relaxed condition comprises an annular, monolithic body with a first, radially outwardly facing, annularly extending seal surface, and a second, radially inwardly facing, annularly extending seal surface, the second seal surface having at least one annularly extending, radially inwardly projecting rib, the rib having a radially innermost convex portion when viewed in transverse cross-section, annularly extending reliefs being formed on axially opposite sides of the rib, the seal member being made of a substantially non-elastomeric material that has sufficient memory to provide an interference seal between the seal member and the housing, and the seal member and the sleeve.

U.S. Pat. No. 5,080,325 describes coating of corrosion-prone parts in valve devices with corrosion-proof metal alloys.

U.S. Pat. No. 5,285,850 describes a well completion system which is connected to coiled tubing, with a sliding sleeve valve for controlling a flow of production fluid into the tubing string.

SUMMARY OF THE INVENTION

The object of the invention is to provide an improved sleeve valve device for fluid flow between a hydrocarbon reservoir and a well in the hydrocarbon reservoir. A further object is to provide a method for assembly of the sleeve valve device.

The objects are achieved according to the invention with a sleeve valve device and a method of the type mentioned in the introduction which are characterized by the features indicated in the claims.

The invention therefore relates to a sleeve valve device for fluid flow between a hydrocarbon reservoir and a well in the hydrocarbon reservoir, where the well in the reservoir area comprises a casing, where the sleeve valve has an elongate, cylindrical shape and is mounted inside the casing or integrated in a portion of the casing and comprises a fixed outer sleeve and a rotatable inner sleeve which by means of an actuator or a tool is rotatable in order to bring apertures in the outer sleeve and the inner sleeve into and out of correspondence with each other, for adjustment of the fluid flow through the apertures. The outer sleeve and the inner sleeve will be produced separately and machined to exact tolerances. The inner sleeve comprises at least one external bulb with a surface which, in an unassembled, unloaded condition of the outer sleeve and the inner sleeve, is at a distance from the inner sleeve's centre line which is greater than the outer sleeve's internal radius. After the inner sleeve has been mounted inside the outer sleeve, the bulb will be pressed against the inside of the outer sleeve, and both the outer sleeve and the inner sleeve will thereby be slightly deformed. This deformation will result in a contact pressure between the surface of the bulb and the inside of the outer sleeve.

The bulb has a surface which is larger than a corresponding aperture in the outer sleeve, and by means of a rotation of the inner sleeve to a closed position of the sleeve valve, the bulb can be caused to cover the outer sleeve's aperture. In the closed position, the bulb thereby encompasses the outer sleeve's aperture with a sealing contact pressure in an area round the outer sleeve's aperture.

A sealing of the outer sleeve's aperture is thereby achieved without the use of gaskets. The extent of the contact pressure and its variation in the event of varying operating conditions, particularly different internal and external pressures in the sleeve valve, may be influenced by geometric ratios relating to the outer sleeves and the inner sleeves with the bulb. According to the invention several highly advantageous geometric ratios have been found, which will be explained in greater detail in the detailed part of the description.

In a preferred embodiment, in the inner sleeve's unassembled condition, the bulb's surface is cylindrical and has a centre line which is parallel to the inner sleeve's centre line, and the centre line for the bulb's cylindrical surface is located between the bulb and the inner sleeve's centre line. This embodiment has been found to provide a good seal.

The bulb preferably has sloping or rounded lateral edges to avoid jamming when the inner sleeve is rotated. Furthermore, in areas near the apertures, both the bulb and the inside of the outer sleeve are preferably coated with hard metal, thus substantially reducing wear and tear from sand in the well.

The sleeve valve device according to the invention may have several constructive embodiments. However, it is preferred that the outer sleeve has two apertures in a transverse plane of the sleeve valve, and that the inner sleeve has two bulbs and two apertures which can be brought into correspondence with these two apertures in the outer sleeve. A symmetrical structure is thereby provided where laterally directed forces balance one another. There may further be several transverse planes with apertures provided in the sleeve valve's longitudinal direction, thus obtaining a desired area for the apertures.

In addition to the inner sleeve being rotatable to positions where the bulbs completely close the outer sleeve's apertures, i.e. a completely closed position of the sleeve valve, and positions where the outer sleeve's and the inner sleeve's apertures correspond completely, the inner sleeve may also be rotatable to one or more intermediate positions. A stepless control of the sleeve valve can be achieved by this means.

The rotation of the inner sleeve may be performed by means of a gripping tool which is mounted at the end of a drill string, and which can grip the inner sleeve and rotate it together with the drill string. The rotation may also be performed by a remotely controlled rotation tool which can be remotely controlled by coiled tubing or cable, and which by means of built-in hydraulically or electrically activateable gripping members can grip the inner sleeve and rotate it, while other gripping members secure the rotation tool to the casing. The sleeve valve device according to the invention may also be provided with a built-in, remotely controlled hydraulically or electrically activateable rotating mechanism for rotating the inner sleeve.

The invention also relates to a method for assembly of the sleeve valve device, where the outer sleeve and the inner sleeve are produced separately. By means of this method at least one of the outer sleeve and the inner sleeve is elastically deformed, whereupon the inner sleeve is inserted into the outer sleeve. The deformation of the outer sleeve may be performed with a hydraulic press, and deformation of the inner sleeve may be performed with wedges.

BRIEF DESCRIPTION OF THE DRAWINGS

The invention will now be explained in more detail in association with a description of a specific embodiment, and with reference to the drawings, in which.

DESCRIPTION OF THE PREFERRED EMBODIMENT

Figure 1A:
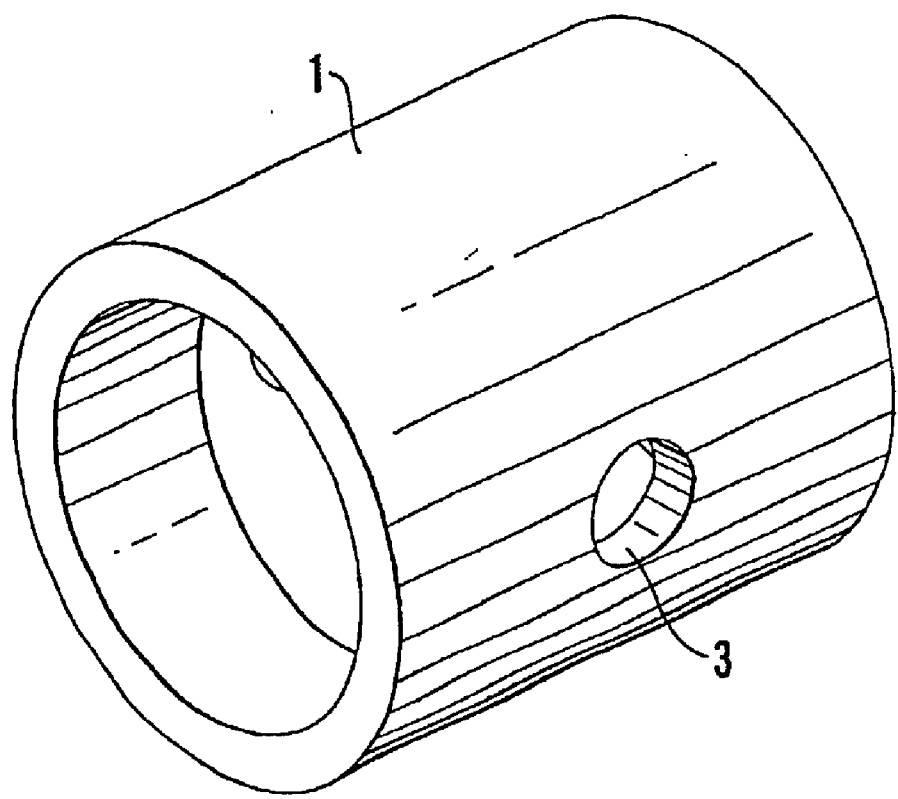
FIGS. 1a–c illustrate an outer sleeve which forms part of a sleeve valve device according to the invention.
Figure 1B:
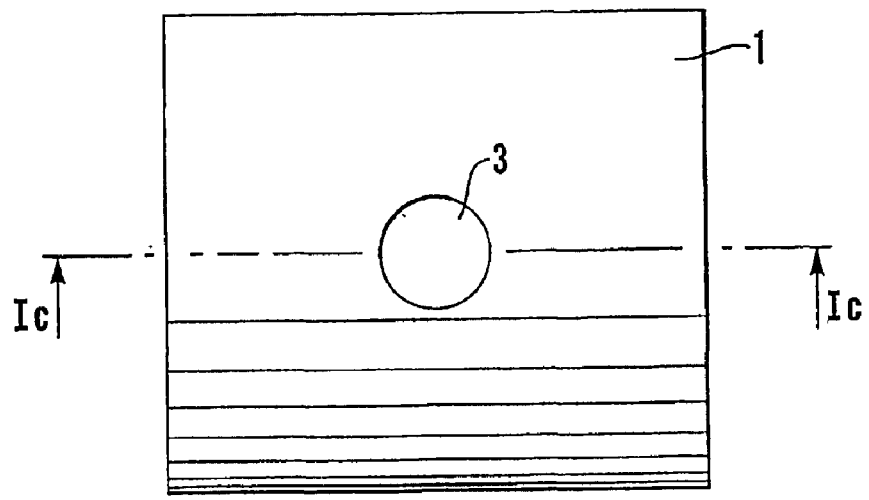
Figure 1C:
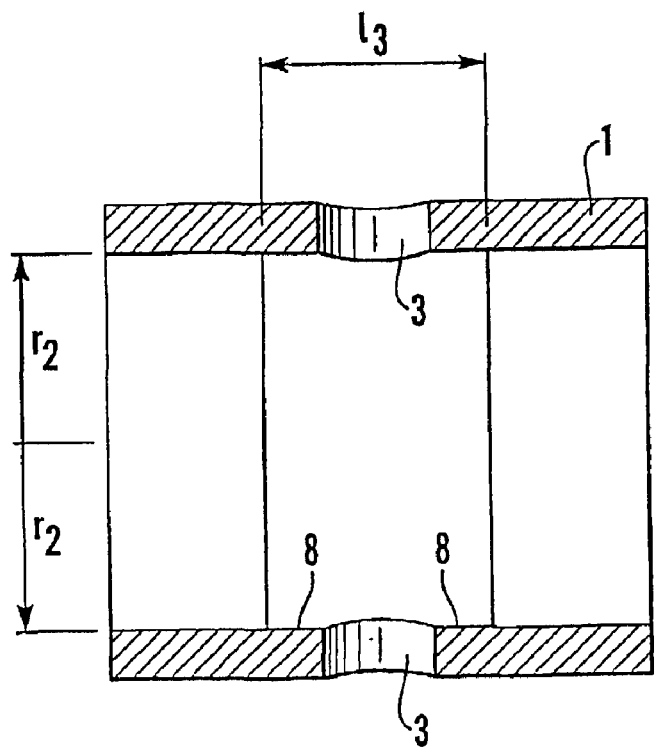

FIG. 1a is a perspective view of an outer sleeve 1 which forms part of a sleeve valve device according to the invention. FIG. 1b illustrates the outer sleeve viewed from the side, while FIG. 1c illustrates a longitudinal section taken along the intersecting line Ic—Ic in FIG. 1b. The outer sleeve 1 has two apertures 3 arranged diametrically opposite each other, and an internal radius $r_2$.

Figure 2A:
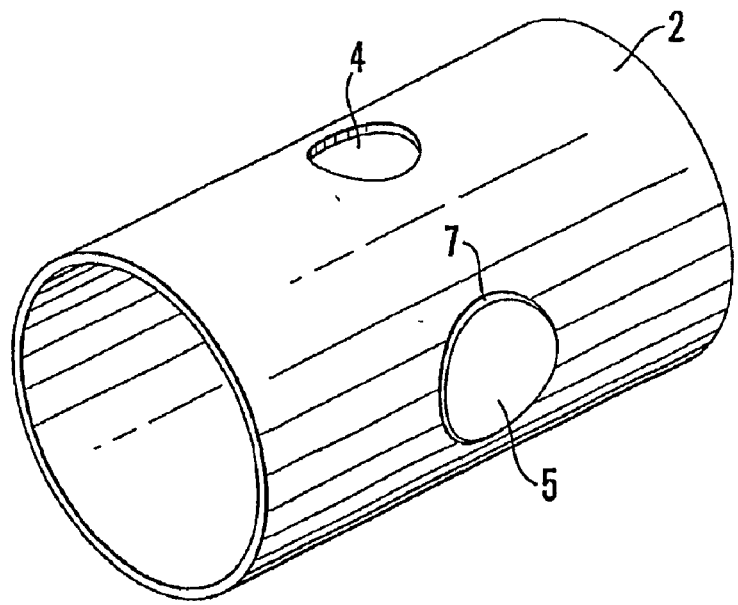
FIGS. 2a–d illustrate an inner sleeve which forms part of a sleeve valve device according to the invention.
Figure 2D:
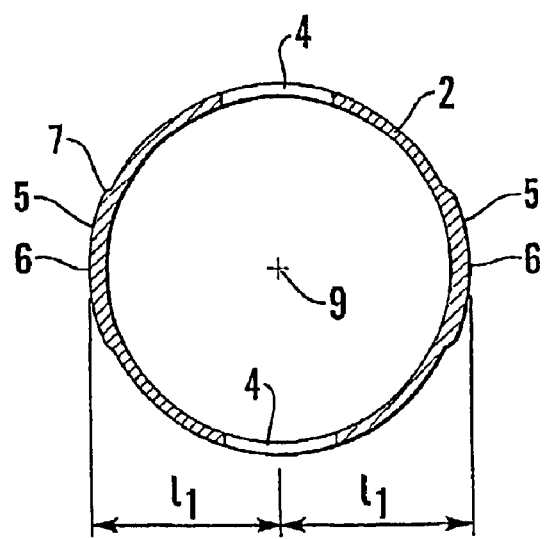
Figure 2B:
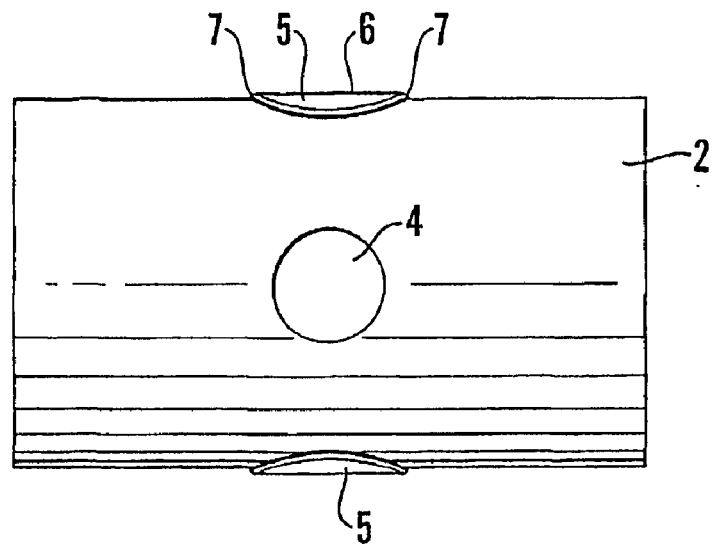
Figure 2C:
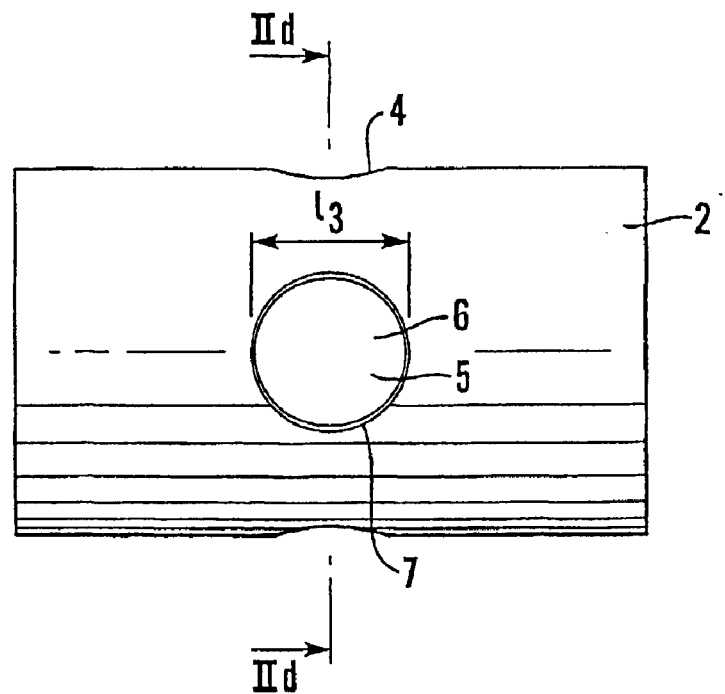

FIG. 2a is a perspective view of an inner sleeve 2 which forms part of a sleeve valve device according to the invention. FIGS. 2b and 2c illustrate the inner sleeve 2 from the side, in views which are at 90° to each other. FIG. 2d illustrates a cross section taken along intersecting line IId—IId in FIG. 2c. The inner sleeve 2 has two apertures 4 arranged diametrically opposite each other, and two bulbs 5, which are also arranged diametrically opposite each other. The bulbs 5 are illustrated in circular form, but this is not a condition of the invention. As illustrated in FIG. 2d the bulbs 5 have surfaces 6 which are at distances $l_1$ from a centre line 9 of the inner sleeve 2.

Figure 3A:
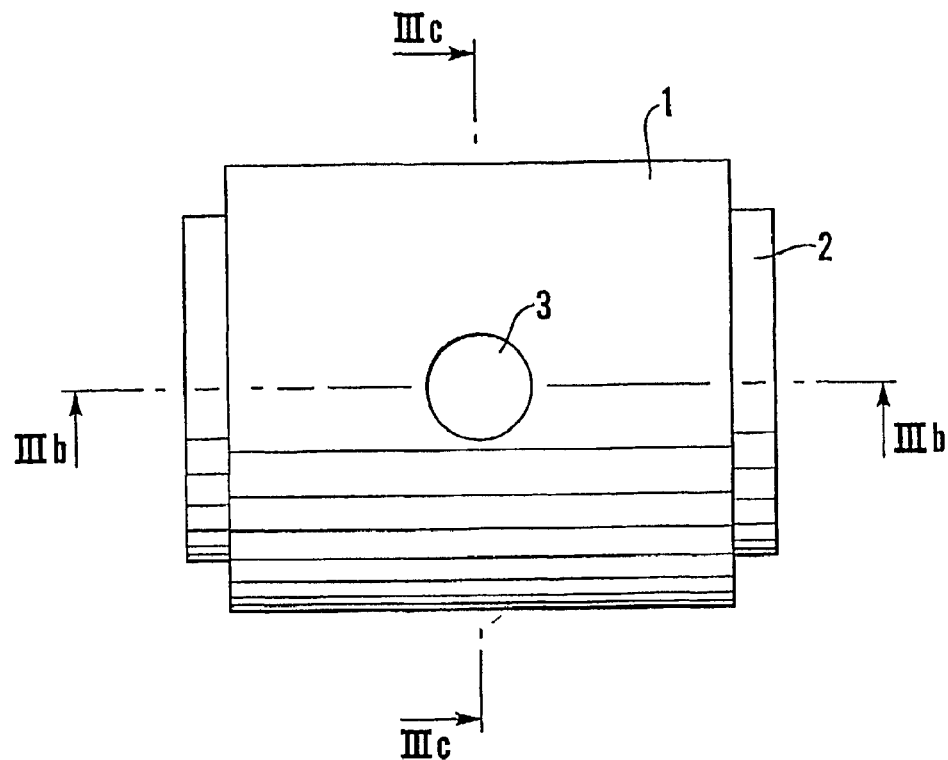
FIGS. 3a–e illustrate the inner sleeve mounted inside the outer sleeve.
Figure 3B:
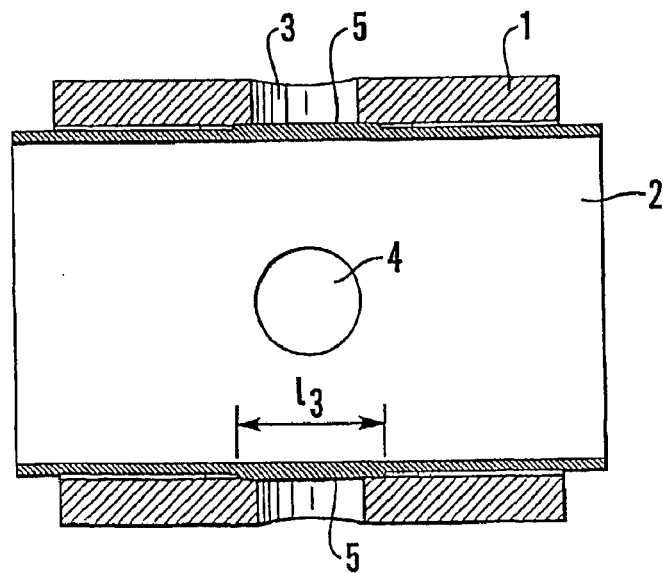
Figure 3C:
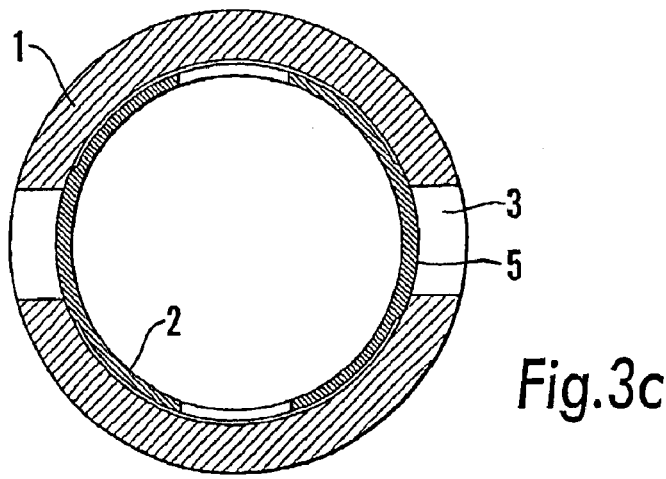
Figure 3D:
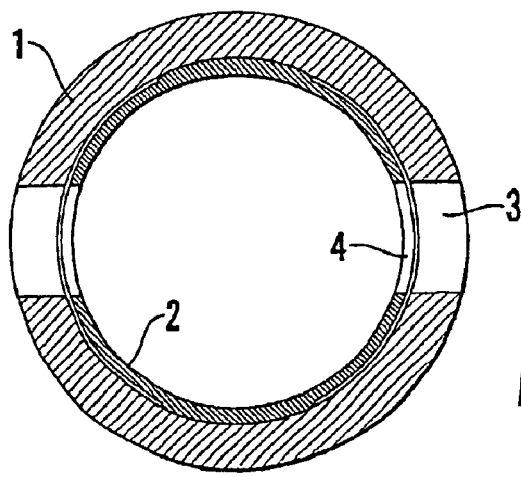
Figure 3E:
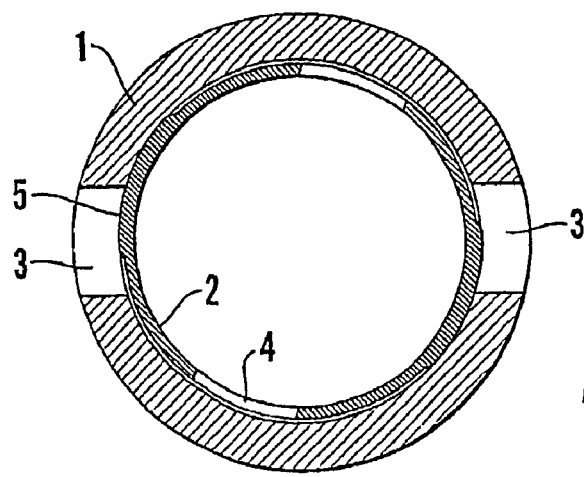

FIG. 3a is a side view illustrating the inner sleeve 2 mounted inside the outer sleeve 1. FIG. 3b illustrates a longitudinal section taken along intersecting line IIIb—IIIb in FIG. 3a, while FIGS. 3c–e illustrate cross sections taken along intersecting line IIIc—IIIc in FIG. 3a, in different positions of the inner sleeve 2.

The assembled outer sleeve 1 and inner sleeve 2 form part of a sleeve valve for fluid flow between a hydrocarbon reservoir and a well in the hydrocarbon reservoir, where the well in the reservoir area comprises a casing. The sleeve valve has an elongate, cylindrical shape, and may be a part of the casing, the outer sleeve being integrated in a portion of the casing, and be screwed into it in the same way as a pipe joint. In a second embodiment the casing may be perforated, and the sleeve valve mounted inside the casing, seals between the sleeve valve and the casing at the end of the outer sleeve preventing fluid flow outside the sleeve valve.

The outer sleeve 1 is therefore fixed and stationary, while the inner sleeve 2 is rotatable. By means of a non-illustrated actuator or a tool, the inner sleeve 2 can be rotated into positions where the outer sleeve's apertures 3 correspond with the inner sleeve's apertures 4, this being illustrated in FIG. 3d. Here the sleeve valve is in an open position, where fluid can flow from the reservoir to the well or vice versa, depending on the sleeve valve's application. When the apertures 3, 4 are brought out of correspondence with each other, the fluid flow will be reduced. The problem which is solved with the sleeve valve device according to the invention is how the fluid flow should be blocked off under different operating conditions in the well.

As mentioned in the general part of the description, sleeve valves are known in the prior art, and both the actual sleeve valve and the devices for rotating the inner sleeve may be designed in several ways. The invention is limited to the actual sleeves which close or open the fluid flow, and the following explanation will be restricted to this.

The outer sleeve 1 and the inner sleeve 2 will be produced separately, and machined to exact tolerances. In an unassembled, unloaded condition of the outer sleeve 1 and the inner sleeve 2, the distance $1_1$ from the bulb's 5 surface 6 to the inner sleeve's centre line 9 is greater than the outer sleeve's internal radius $r_2$. After the inner sleeve 2 has been mounted inside the outer sleeve 1, the bulb 5 will be pressed against the inside of the outer sleeve 1, and both the outer sleeve 1 and the inner sleeve 2 will thereby be slightly deformed. This deformation will result in a contact pressure between the bulb's surface 6 and the inside of the outer sleeve 1.

The inner sleeve 2 can be rotated to a closed position of the sleeve valve, where the bulbs 5 cover the outer sleeve's apertures 3, this being illustrated in FIG. 3c.

The bulbs' 5 surfaces 6 are larger than the apertures 3, which is illustrated in FIGS. 2c and 3b with the length $1_3$ of the bulb 5. The length $1_3$ is also illustrated in FIG. 1c, $1_3$ being understood here to indicate a length of the outer sleeve 1 which is covered by the bulbs 5 during rotation of the inner sleeve 2.

In the closed position of the sleeve valve, the bulb 5 thereby encompasses the outer sleeve's aperture 3 with a sealing contact pressure in an area 8 (see FIG. 1c) round the outer sleeve's aperture 3. Sealing is thereby achieved of the outer sleeve's apertures 3 without the use of gaskets.

It is preferred that the outer sleeve's apertures 3 and the inner sleeve's apertures 4 and bulbs 5 are symmetrically arranged along the sleeve valve's circumference in the same transverse plane of the sleeve valve, with the result that forces between the outer sleeve 1 and the inner sleeve 2 are balanced. A preferred number of apertures 3, 4 and bulbs 5 is two in each transverse plane, as illustrated in the figures. In a practical embodiment of the sleeve valve device according to the invention, depending on through-flow requirements, there may be several transverse planes with valves mounted successively in the sleeve valve's longitudinal direction, for example 5 transverse planes, thus providing a total number of 2×5=10 apertures in the sleeve valve.

The inner sleeve 2 may furthermore be rotatable to at least one intermediate position between full correspondence between the outer sleeve's and the inner sleeve's apertures 3, 4 and a closed position. This may be a position where the outer sleeve's and the inner sleeve's apertures 3, 4 partly correspond, or as illustrated in FIG. 3e, a position where the bulb 5 partly covers the aperture 3, and fluid flow is permitted along the outside of the inner sleeve 2 to the aperture 4.

When there is stepless rotation of the inner sleeve 2 between several intermediate position, stepless control of the sleeve valve can be achieved.

Figure 4:
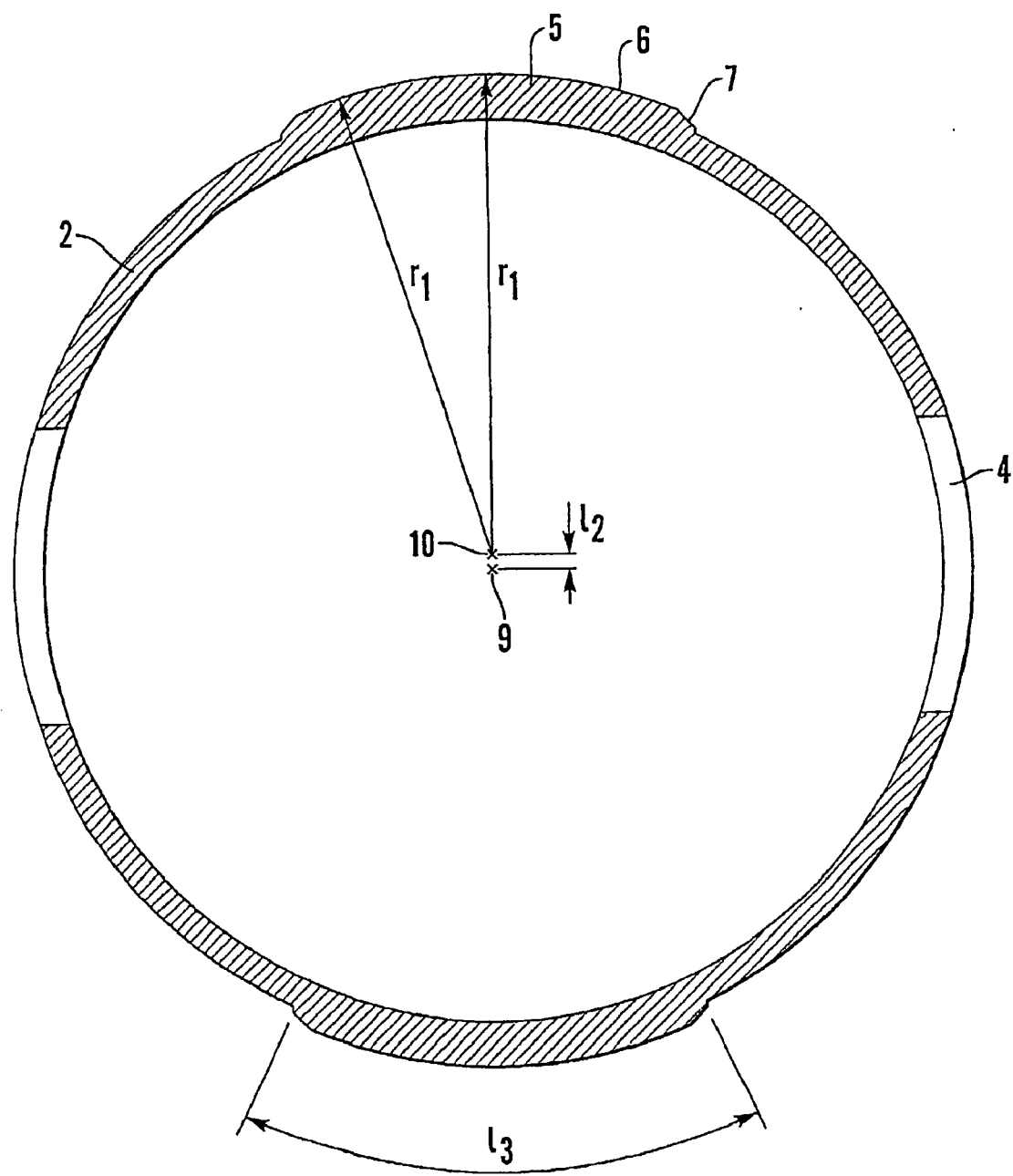
FIG. 4 illustrates details of the inner sleeve.

The bulb 5 preferably has sloping or rounded lateral edges 7, see FIGS. 2 and 4, thus avoiding jamming and unnecessary wear on the outer sleeve on account of sharp edges on the bulb 5 when the inner sleeve is rotated.

In order to further reduce wear and tear, particularly due to sand in the well, the inside of the outer sleeve 1 is preferably coated with hard metal in areas 8 near the apertures 3. These hard metal-coated areas 8 may extend over an area limited to the edge of the apertures 3, they may constitute the whole of the area covered by the bulbs 5 when the sleeve valve is in a closed position, or they may constitute the whole of the area over which the bulbs 5 are moved during rotation of the inner sleeve 2. In order to further reduce wear and tear, it is preferred that the bulbs' surfaces 6 are coated with hard metal. A suitable hard metal for the inside of the outer sleeve 1 is "TAFA 95 MCX" (FE 29Cr 4B 2Si 2Mn), while a suitable hard metal for the bulbs 5 is "TAFA 1350VF" (86WC 10Co 4 Cr).

It has been found that the contact pressure between the bulb 5 and the area 8 round the outer sleeve's aperture 3 in a condition where the sleeve valve is not exposed to external or internal overpressure, i.e. a condition without differential pressure between the outside and the inside of the sleeve valve, should be 30–60 MPa, preferably 40–50 MPa and most preferred approximately 45 MPa. Calculations have been performed for a sleeve valve in a closed position with an external diameter of 209 mm, an outer sleeve with wall thickness of 20.9 mm and two apertures with a diameter of 50 mm, and an inner sleeve with wall thickness of 5 mm, two apertures with a diameter of 50 mm and two bulbs with a diameter of 70 mm and wall thickness of 7.7 mm. These calculations show that for this most preferred contact pressure of 45 MPa in a condition without differential pressure, an external overpressure of 5.0 MPa leads to a contact pressure of 51 MPa, while an internal overpressure of 34.5 MPa leads to a contact pressure of 374 MPa. These contact pressures are considered to be good values, and show that the sleeve valve device according to the invention will maintain its sealing effect in a closed position in the event of realistically occurring differential pressure.

In order to obtain a good seal in a closed position, it has been found that, measured in the unassembled condition of the outer sleeve 1 and the inner sleeve 2, i.e. before the outer sleeve and the inner sleeve are exposed to deformation during assembly, the ratio between the distance $1_1$ from the bulb's surface 6 to the inner sleeve's centre line 9 and the outer sleeve's internal radius $r_2$ should be between 1.005 and 1.011, preferably between 1.007 and 1.009, and most preferred approximately 1.008.

FIG. 4 illustrates details of the inner sleeve 2. As in FIG. 2d, the inner sleeve's centre line 9 is indicated here by a cross. It has been found that, measured in the inner sleeve's 2 unassembled condition, the bulb's surface 6 should be cylindrical. Furthermore, it has been found that the bulb's cylindrical surface 6 should have a centre line 10 which is parallel to the inner sleeve's centre line 9, and that the centre line 10 should be located between the bulb 5 and the inner sleeve's centre line 9.

The centre line 10 for the bulb's cylindrical surface 6 is indicated in FIG. 4 by across, while the radius of the bulb's cylindrical surface 6 is indicated by $r_1$. The distance between the centre lines 9, 10 is indicated by $l_2$. In order to achieve a good seal in a closed position, it has been found that, measured in the inner sleeve's 2 unassembled condition, the ratio between $l_2$ and $r_1$ should be between 0.02 and 0.04, preferably between 0.025 and 0.035 and most preferred approximately 0.03. Furthermore, it has been found that, in the unassembled condition of the outer sleeve and the inner sleeve, the ratio between the radius $r_1$ of the bulb's 5 cylindrical surface and the outer sleeve's internal radius $r_2$ should be between 0.97 and 0.99, and most preferred approximately 0.98.

The invention also relates to a method for assembly of a sleeve valve device according to the invention, where the outer sleeve 1 and the inner sleeve 2 are produced separately. According to this method at least one of the outer sleeve 1 and the inner sleeve 2 is elastically deformed, and the inner sleeve 2 is then inserted into the outer sleeve 1. The elastic deformation of the inner sleeve 2 may be performed by wedges, and be arranged to press outwards areas of the inner sleeve which are located 90° relative to the bulbs 5, with the result that the bulbs 5 are moved slightly inwards. The elastic deformation of the outer sleeve 1 can be performed with a hydraulic press, and be arranged to press inwards areas of the outer sleeve 1 which are located 90° to the location where the bulbs 5 have to be inserted, with the result that the areas of the outer sleeve where the bulbs 5 have to be inserted are moved slightly outwards. Space is thereby provided for inserting the inner sleeve 2 with the bulbs 5 into the outer sleeve 1.

What is claimed is:

1. A sleeve valve device for fluid flow between a hydrocarbon reservoir and a well in the hydrocarbon reservoir, where the well in the reservoir area comprises a casing, where the sleeve valve has an elongate, cylindrical shape and is mounted inside the casing or is integral with a portion of the casing and comprises a fixed outer sleeve and a rotatable inner sleeve which by means of an actuator or a tool is rotatable in order to bring apertures in the outer sleeve and the inner sleeve into and out of correspondence with each other, for adjustment of the fluid flow through the apertures, characterized in that the inner sleeve comprises at least one external bulb with a surface which, in an unassembled, unloaded condition of the outer sleeve and the inner sleeve , is at a distance $l_1$ from the inner sleeve's center line which is greater than the outer sleeve's internal radius $r_2$, and, in the inner sleeve's unassembled condition, the bulb's surface is cylindrical and has a center line which is parallel to the inner sleeve's center line, and that the center line of the bulb's cylindrical surface is located between the bulb and the inner sleeve's center line;

the bulb's surface is larger than a corresponding aperture in the outer sleeve; and by means of a rotation of the inner sleeve to a closed position of the sleeve valve, the bulb can be caused to cover the outer sleeve's aperture;

whereby the bulb in the closed position encompasses the outer sleeve's aperture with a sealing contact pressure in an area round the outer sleeve's aperture.

2. The device according to claim 1, characterized in that, in the unassembled condition of the outer sleeve and the inner sleeve, the ratio between the distance $l_1$ from the bulb's surface to the inner sleeve's center line and the outer sleeve's internal radius $r_2$ is between 1.005 and 1.011, preferably between 1.007 and 1.009 and most preferred approximately 1.008.

3. The A device according to claim 1, characterized in that, in the inner sleeve's unassembled condition, the ratio between the distance $l_2$ from the center line of the bulb's cylindrical surface to the inner sleeve's center line and the radius $r_1$ of the bulb's cylindrical surface is between 0.02 and 0.04, preferably between 0.025 and 0.035 and most preferred approximately 0.03.

4. The device according to claim 1, characterized in that, in the unassembled condition of the outer sleeve and the inner sleeve, the ratio between the radius $r_1$ of the bulb's cylindrical surface and the outer sleeve's internal radius $r_2$ is between 0.97 and 0.99, and most preferred approximately 0.98.

5. The device according to claim 1, characterized in that the bulb has sloping or rounded lateral edges.

6. The device according to claim 1, characterized in that the inside of the outer sleeve in the area near the apertures is coated with hard metal.

7. The device according to claim 1, characterized in that the bulb is coated with hard metal.

8. The device according to claim 1, characterized in that the contact pressure between the bulb and the area round the outer sleeve's aperture in a condition where the sleeve valve is not exposed to external or internal overpressure is 30–60 MPa, preferably 40–50 MPa and most preferred approximately 45 MPa.

9. The device according to claim 1, characterized in that, in a transverse plane of the sleeve valve, the outer sleeve has two apertures, and the inner sleeve has two bulbs and two apertures which can be brought into correspondence with the outer sleeve's apertures.

10. The device according to claim 1, characterized in that the inner sleeve is rotatable to at least one intermediate position between full correspondence between the outer sleeve's and the inner sleeve's apertures and closed position.

11. A method for assembly of the sleeve valve device according to claim 1, comprising the steps of:

producing the outer sleeve and the inner sleeve separately, elastically deforming at least one of the outer sleeve and the inner sleeve, and inserting the inner sleeve into the outer sleeve.

12. The method according to claim 11, characterized in that prior to assembly, the outer sleeve is elastically deformed by a hydraulic press.

13. The method according to claim 11, characterized in that prior to assembly, the inner sleeve is elastically deformed by wedges.

* * * * *